Feb. 21, 1933.    E. L. GAINES    1,898,248
VALVE REGULATOR
Filed July 9, 1928
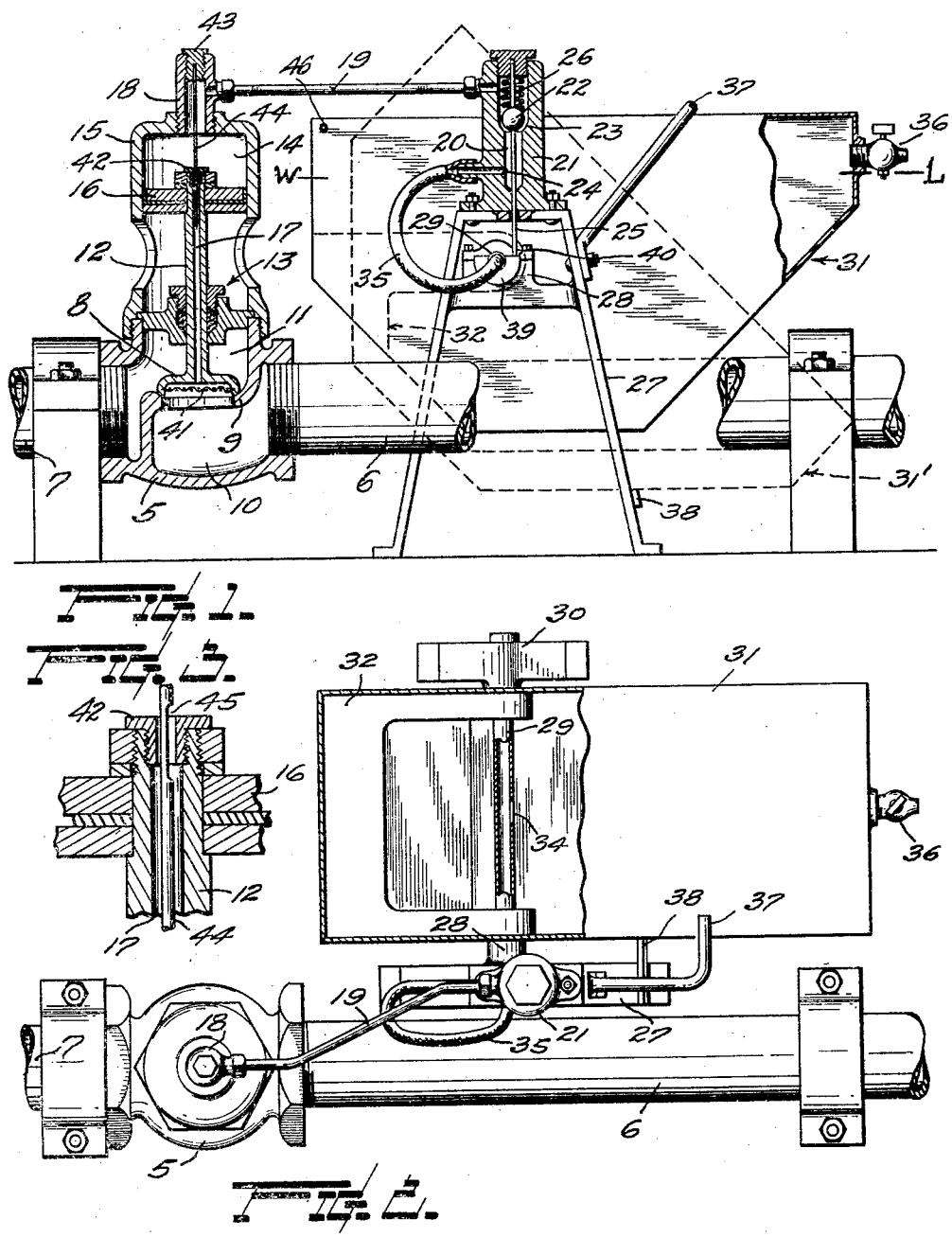
INVENTOR:
Ernest L. Gaines
BY
ATTORNEY Patented Feb. 21, 1933

1,898,248

UNITED STATES PATENT OFFICE

ERNEST LAMAR GAINES, OF SEATTLE, WASHINGTON

VALVE REGULATOR

Application filed July 9, 1928. Serial No. 291,204.

This invention relates to devices for regulating the operation of a valve which controls the water supply of an intermittently acting sprinkling system.

The object of my invention, generally, is the perfecting of adjustable devices of this character.

More specific objects and advantages of the invention will appear in the following specification.

The invention consists in the novel construction, arrangement and combination of parts hereinafter described and claimed.

In the accompanying drawing,—

Figure 1 is a view partly in side elevation and partly in longitudinal vertical section of apparatus embodying the present invention; Fig. 2 is a plan view of Fig. 1, a portion of the water receptacle being broken away and a portion of the pivot shaft therefor shown in horizontal section; and Fig. 3 is a fragmentary sectional elevation of governing devices to an enlarged scale.

In said drawing, the reference numeral 5 designates a valve casing having its inlet connected to a water service pipe 6, and its outlet to a delivery pipe 7. As illustrated, the valve is of the globe type wherein the valve proper 8, hereinafter termed the main valve, consists of a disk adapted to close upon a seat surrounding the passage provided in the partition 9 which divides the interior of the casing into an inlet chamber 10 and an outlet chamber 11.

The stem 12 of said valve is tubular and extends through a stuffing box 13 of the casing into the bore 14 of a cylinder 15 having an open end and which may be formed integral with said casing or, as shown, be rigidly secured thereto. Rigid with the upper end of said stem within the cylinder is a piston 16 having an area greater than that of said valve.

The passage 17 extending axially through the stem 12 provides communication between the inlet chamber 10 of the casing 5 and the space above the piston in the cylinder bore.

The under surface of the piston 16 is exposed to the atmosphere. Secured to the cylinder 15 is a hollow fitting 18 through which and a tube 19 communication is had between the upper portion of the cylinder bore and the upper portion of the chamber 20 of the casing 21 of a second valve 22, hereinafter termed the controlling valve. Said controlling valve is adapted to be closed by means of a spring, such as 26, against a seat 23 provided in the chamber 20 between its connection with the tube 19 and an outlet 24.

Said controlling valve is rigidly mounted upon a rod 25 extending into a guide provided therefor above the valve in the casing 21; the portion of the rod 25 below the valve being guided in an aperture provided in the lower portion of the casing, and protruding therefrom into operative relation with an actuator to be presently described.

Said spring 26 serves to yieldingly retain the controlling valve upon its seat 23 to thereby interrupt the flow of water through the casing 21.

This casing is rigidly secured to a suitable support, herein represented as a standard 27, which may also serve as a support for the journal box 28 for a horizontal hollow shaft 29 which has another bearing in a standard 30. Said shaft extends through and is secured intermediate its journal bearings to a water receptacle or tank 31.

The shaft 29, which serves as a pivot for said tank, is positioned to one side of the midlength of said tank so as to provide within the tank a greater space to the front of said shaft than to the rear thereof. A heavy body 32 secured to the rear portion of the tank acts counter to the weight of the front portion of the tank so that when the latter is empty, or nearly so, the unbalanced weight of the body 32 is capable of restoring the tank into its normal position as represented by full lines in Fig. 1.

When the tank, however, is charged with a sufficient volume of water—say to the plane denoted by WL in Fig. 1—the center of gravity of the tank and the contents thereof is shifted forwardly of its pivot shaft to overcome the power of the counterweight 32 and thus cause the tank to turn about its pivot into the water emptying position in which it is indicated by dotted lines $31^1$ in Fig. 1.

Water is admitted into the tank through a hole 34 provided in the periphery of the tubular shaft 29, which water is supplied through a conduit 35, preferably a flexible tube, communicatively connecting the outlet 24 of the valve casing 21 with an end of the passage within the pivot shaft 29.

Water is emptied from the upper portion of the front end of the tank. For the purpose of regulating the effective size of such outlet through which the water is discharged, such outlet may advantageously be provided with a drain cock 36 of known construction. 37 and 38 represent stops secured to a stationary support, as the standard 27 for instance, for limiting the turning movement of the tank.

39 represents a cam secured to the shaft 29 and is provided with a shoulder 40 which is engageable with the rod 25 to effect the unseating of the controlling valve 22 when the tank is being brought into the position in which it is illustrated by full lines in Fig. 1.

41 represents a strainer, provided in the main valve 8 preferably, to exclude dirt or other particles of matter from the stem passage 17. The upper end of this stem passage is provided with a relatively small water discharge opening into the cylinder bore 14.

To which end I provide in the passage 17—as best shown in Fig. 3—a bushing 42 which cooperates with a needle 44 depending from a plug member 43 (Fig. 1) which is secured to the fitting 18, the needle extending axially through said bushing provides therein an annular orifice through which water may pass into the cylinder bore 14.

The needle 44 is, moreover, characterized by having in its periphery a recess 45 which is positioned, with respect to the bushing and the main valve 8, to permit a maximum feed of water into the chamber 14, except when the valve is in the early portion of its opening movement and in the last portion of its closing movement, at which times the delivery of water through the passage 17 is throttled temporarily restraining the valve to prevent shocks or "water hammering" in the apparatus. The tank 31 is advantageously provided with a vent 46 to facilitate the discharging of the water through the drain cock 36.

Assuming the several parts of the apparatus occupy the relative positions in which they are illustrated in Fig. 1, as obtains subsequent to the return of the tank, after being emptied of water, into its normal full line position. Thus arranged the controlling valve 22 has by means of the cam 39, been lifted from its seat 23, whereupon the water escapes by a siphoning effect from the cylinder bore 14 into the tank 31.

The water pressure above the piston is thus reduced, whereupon atmospheric pressure against the underside of the piston, supplemented by the pressure of water in the chamber 10 acting against the underside of the main valve 8 effects the raising of the latter from its seat to permit the delivery of water from the service pipe 6 through the pipe 7.

The water escaping from the cylinder bore 14 is replenished by water supplied through the valve-stem passage 17.

The flow of the water from the cylinder into the tank continues until the body of water supplied to the tank overbalances the latter and turns the same into its dotted line ($31^1$) emptying position. When this occurs the cam 39 is influenced to permit the spring 26 to effect the closing of the controlling valve 22, whereupon the discharge of water from the cylinder bore ceases, but the continuing of the supply of water through the passage 17 into the cylinder accumulates a water pressure above the piston 16 to force the piston downwardly with a consequent closing of the main valve 8.

When enough water is emptied from the tank 31, the power of the counter weight 32 asserts itself to restore the tank into its full line position and thus complete a cycle of operation.

From the foregoing description it is apparent that the main valve 8 opens and closes, so to speak, responsive to the opening and closing of the controlling valve 22, which in the illustrated embodiment of the invention, is automatically regulated by the tank 31 and spring 26, acting alternately.

The length of time between the closing and opening of the main valve is determined by the emptying time of the tank and which may be regulated by adjusting the discharge valve 36.

The length of time between the opening and closing of the main valve—that is, while the latter affords a water supply to pipe 7—is determined by the quantity of water passing through the cylinder bore for charging the tank.

Such water supply to the tank may be regulated in several ways as, for examples, by adjusting the rotary position of the cam 39 to lift the controlling valve 22, more or less, or preferably by employing a needle 44 of greater or less diameter, to throttle more or less the water issuing from the orifice of the bushing 42.

The invention and the manner of its operation will, it is believed, be understood from the foregoing description of the now preferred embodiment.

What I claim, is,—

1. The combination with a valve-casing having inlet and outlet chambers and a partition separating said chambers and having a passage, of a main valve applied to said passage on the outlet side of the valve casing and exposed to the pressure in said inlet chamber, a cylinder closed at one end and opening at its other end into the atmosphere, a piston of larger diameter than said valve arranged in the cylinder and connected with said valve, a supply passage leading from said inlet chamber into the closed end of said cylinder, said passage being restricted by two elements, one of which moves with relation to the other at each cycle of operation of the main valve, an exhaust passage leading from the closed end of said cylinder communication from said exhaust passage to the atmosphere, an auxiliary valve for said exhaust passage automatically operated to open and close the same with respect to the atmosphere to control the pressure within the closed end of the cylinder for regulating the opening and closing movements of said main valve, and means dependent upon the rate of flow through said supply passage for determining the time said auxiliary valve shall remain in open position.

2. The combination with a valve-casing having inlet and outlet chambers and a partition separating said chambers and having a passage, of a main valve applied to said passage on the outlet side of the valve-casing and exposed to the pressure in said inlet chamber, a cylinder closed at one end and opening at its other end into the atmosphere, a piston of larger diameter than said valve arranged in the cylinder and connected with said valve, a supply passage leading from said inlet chamber into the closed end of said cylinder an exhaust passage leading from the closed end of said cylinder, an auxiliary valve for said exhaust passage to control the pressure within the closed end of the cylinder for regulating the opening and closing movements of said main valve, and means rendered operative by liquid supplied from the exhaust passage for opening and closing said auxiliary valve successively at predetermined intervals.

3. The combination with a valve-casing having inlet and outlet chambers and a partition separating said chambers and having a passage, of a main valve applied to said passage on the outlet side of the valve-casing and exposed to the pressure in said inlet chamber, a cylinder closed at one end and opening at its other end into the atmosphere, a piston of larger diameter than said valve arranged in the cylinder and connected with said valve, a supply passage leading from said inlet chamber into the closed end of said cylinder and an exhaust passage leading from the closed end of said cylinder, an auxiliary valve for said exhaust passage rendered operative responsive to liquid supplied from said cylinder to control the pressure within the closed end of the cylinder for regulating the opening and closing movements of said main valve, and means consisting of two elements, one of which is fixed and the other moving in relation thereto at each opening and closing movement of the main valve for cleaning said supply passage.

4. The combination with a valve-casing having connected inlet and outlet chambers, and a main valve controlling the passage of fluid from the inlet to the outlet chamber, of a cylinder containing a piston of larger area than said valve, one end of said cylinder being closed, a tubular stem connecting said valve to the piston and providing a supply passage leading from said inlet chamber of the valve-casing into the closed end of the cylinder, a water receptacle arranged for upward and downward reciprocatory movement, a counter weight for yieldingly retaining the receptacle in its upper position, said receptacle being provided with a controllable orifice adapted for discharge of water from the receptacle when the latter is in its lower position, an exhaust passage leading from the closed end of said cylinder to the water receptacle, an auxiliary valve for controlling the flow of water through said exhaust passage, means influenced by alternate movements of said receptacle to effect the opening and closing of the auxiliary valve whereby the water pressure in the cylinder acting against said piston is controlled to effect the opening and closing of the main valve responsive to the action of said receptacle.

5. The combination with a valve casing having inlet and outlet chambers with a passage therebetween, a main valve, a cylinder having a water discharge opening, a piston of greater area than said valve provided in the cylinder, a hollow stem connecting the piston to said valve and providing a passage to supply water under pressure into the cylinder, a needle secured to the cylinder and extending into the passage of said stem to control the effective capacity of the passage, and means constituting an auxiliary valve rendered intermittently operative responsive to a discharge of water from said cylinder for regulating the opening and closing movements of said valve.

6. The combination with a valve adapted to open and close a conduit, the opening movement of said valve being effected through continuously applied pressure of liquid from the inlet side of the conduit, the closing movement of the valve being effected by pressure applied to the surface of a movable wall of a chamber wherein said surface is of larger area than the valve, of a passage from said conduit to said chamber, a pressure-relieving exhaust passage from said chamber, an exhaust conduit extending from said exhaust passage to a remote control auxiliary valve, and means for effecting operation of said auxiliary valve responsive to liquid supplied from said exhaust conduit.

7. The combination of a water conduit, a hydraulically operated valve for opening and closing the same, a pilot valve for effecting said opening and closing movements, a water passage leading from said conduit into a receptacle, said passage being restricted by an element adapted for periodic motion relative thereto, and means dependent upon the flow of water through said passage for opening said pilot valve at regular intervals and retaining the pilot valve in open disposition for a predetermined period and closing same to complete a cycle of repetitive action.

8. The combination of a water conduit, supplying water under pressure, a hydraulically operated valve for opening and closing the same, a pilot valve for effecting said opening and closing movements, a restricted water passage leading from the same pressure source as said conduit into a receptacle, a periodically moving element in said passage for maintaining its uniform effective capacity, adjustable means for controlling the flow of water out of said receptacle, and operative connection from said receptacle to said pilot valve for automatically opening and closing same at predetermined intervals.

9. An automatic intermittent valve for a water supply conduit wherein the opening and closing movements of the valve are effected by pressure of water from the conduit, adjustable timing means dependent upon the flow of water from the same pressure source into and out of a receptacle for predetermining the speed of operation of said valve and the periods said valve shall remain open and closed, and means comprising an element adapted for periodic movement in a restricted passage for maintaining a uniform effective capacity of the latter.

10. The combination of a water conduit, a hydraulically operated valve for opening and closing the same, a pilot valve for effecting said opening and closing movements, a restricted passage leading from said conduit, means whereby said restricted passage is maintained in operative condition by the periodic movement of an element in said passage, and means rendered operative by the flow of water therethrough for automatically opening and closing said pilot valve at regular predetermined intervals.

11. The combination of a hydraulically operated water valve, a pilot valve therefor and adjustable automatic timing means depending upon a flow of water into and out of a receptacle for periodically opening said pilot valve, retaining said valve in open disposition for a predetermined period of time, and for closing same at the conclusion of said period, said flow being restricted by the co-operative functioning of two elements, one of which moves periodically with respect to the other.

12. In a water distribution system, the combination of a water conduit, a hydraulically operated valve, one side of which is under pressure from the conduit, for opening and closing the conduit, means including a restricted passage for supplying a water pressure to said valve oppositionally of the conduit pressure, means periodically movable with respect to said passage for maintaining a uniform effective capacity of the same, means co-operative with said passage for determining the intervals of time between successive opening and closing movements of the valve, and a pilot valve for said last named means.

13. In a water distribution system, the combination of a water conduit, a hydraulically operated valve for opening and closing the same, a chamber into which water under pressure is supplied for effecting the operation of said valve, a restricted passage from said distribution system leading into said chamber, a pilot valve for effecting the operation of said first named valve, a water receptacle having inlet and outlet passages, and operative connection from said water receptacle to said pilot valve whereby the latter is opened and closed and by means of which it is retained in open position for a period determined by the rate of flow of water through a restricted passage the definite effective capacity of which is maintained by an element periodically movable with respect to said passage.

14. In a water distribution system the combination of a water conduit, a hydraulically operated valve for intermittently opening and closing the same, a pilot valve for effecting said opening and closing movements, a water receptacle having inlet and outlet passages, and operative connection from said water receptacle to said pilot valve whereby the latter is opened and closed and by means of which it is retained in open position for a period determined by the rate of flow of water through a restricted passage the consistent capacity of which is maintained by an element of said passage periodically moving with relation to another element thereof.

Signed at Seattle, Washington, this 15th day of June, 1928.

ERNEST LAMAR GAINES.